(12) United States Patent
Brookhart et al.

(10) Patent No.: US 9,400,942 B2
(45) Date of Patent: *Jul. 26, 2016

(54) SYSTEM AND METHOD FOR ESTIMATING/DETERMINING THE DATE OF A PHOTO

(71) Applicant: Ancestry.com Operations Inc., Provo, UT (US)

(72) Inventors: Christopher Brookhart, Lehi, UT (US); Jack Reese, Lindon, UT (US)

(73) Assignee: Ancestry.com Operations Inc., Provo, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/988,135

(22) Filed: Jan. 5, 2016

(65) Prior Publication Data

US 2016/0132751 A1    May 12, 2016

Related U.S. Application Data

(62) Division of application No. 13/440,754, filed on Apr. 5, 2012, now Pat. No. 9,251,394.

(51) Int. Cl.
  *G06K 9/62* (2006.01)
  *G06F 17/30* (2006.01)
(52) U.S. Cl.
  CPC .......... *G06K 9/6202* (2013.01); *G06F 17/3028* (2013.01); *G06F 17/30247* (2013.01); *G06F 17/30268* (2013.01); *G06K 9/627* (2013.01); *G06K 9/6215* (2013.01); *G06K 9/6255* (2013.01); *G06F 17/30056* (2013.01)

(58) Field of Classification Search
  None
  See application file for complete search history.

(56) References Cited

U.S. PATENT DOCUMENTS

| | | | |
|---|---|---|---|
| 9,251,394 B2 * | 2/2016 | Brookhart | G06K 9/00 |
| 2008/0278629 A1 * | 11/2008 | Yamada | G06T 5/00 348/565 |
| 2009/0119333 A1 * | 5/2009 | Sundstrom | G06F 17/3028 |
| 2009/0310814 A1 * | 12/2009 | Gallagher | G06F 17/30265 382/100 |

OTHER PUBLICATIONS

Datta, R.—"Studying Aesthetics in Photographic Images Using a Computational Approach" —ECCV 2006, pp. 288-301.*

* cited by examiner

*Primary Examiner* — Bernard Krasnic
(74) *Attorney, Agent, or Firm* — Kilpatrick Townsend & Stockton LLP

(57) ABSTRACT

Undated photos are organized by estimating the date of each photo. The date is estimated by building a model based on a set of reference photos having established dates, and comparing image characteristics of the undated photo to the image characteristics of the reference photos. The photo characteristics can include hues, saturation, intensity, contrast, sharpness and graininess as represented by image pixel data. Once the date of a photo is estimated, it can be tagged with identifying information, such as by using the estimated date to associate the photo with a node in a family tree.

12 Claims, 9 Drawing Sheets

SYSTEM AND METHOD FOR ESTIMATING/DETERMINING THE DATE OF A PHOTO

CROSS REFERENCES TO RELATED APPLICATIONS

This application is a divisional of U.S. patent application Ser. No. 13/440,754, filed Apr. 5, 2012, which is herein incorporated by reference in its entirety for all purposes.

BACKGROUND OF THE INVENTION

With the widespread use of digital photography and digital storage, people are collecting large numbers of photos and copies of photos. In some instances, the photos may be hardcopy or hard print photos (stored in shoe boxes, photo albums and so forth) that were taken many years before, or may be soft, digitally stored copies of hard print photos that have been digitally scanned. While photos might be organized by either placing them in electronic folders or by tagging the photos (i.e., digitally labeling or identifying the photos with pertinent information, such as who is in the photo, where the photo was taken, and when it was taken), this can be very difficult because of the large number of photos that most people collect, because the amount of time that it takes to individually view and classify or identify each photo, and in some cases, because of the age of the photo or other factors that make it difficult to accurately identify the photo.

In some cases, when trying to identify old family photos, people may reference genealogical information, such as a family tree, and guess as to which person in a family tree the photo may relate to. But without knowing the date that the photo was taken, using a family tree to identify a photo can be difficult.

BRIEF SUMMARY OF THE INVENTION

There is provided, in accordance with embodiments of the present invention, a system and method for estimating the image capture date of a photo. The estimated date is based on a comparison of image characteristics of the photo to the image characteristics of reference photos that each have an established or known date.

In one embodiment, the system and method identify image characteristics of an undated photo, compare the image characteristics of the undated photo to image characteristics derived from a plurality of reference photos, where each of the plurality of reference photos have an established date, and estimate the date of the undated photo based on the similarity of the image characteristics of the undated photo to one or more of the image characteristics of the reference photos. In a described embodiment, the image characteristics are obtained from processed pixel data, and include hues, saturation, intensity, contrast, sharpness and graininess.

In another embodiment of the invention, a method and system are provided for identifying a photo. The photo is displayed at a user interface. The image capture date of the displayed photo is estimated by identifying image characteristics of the displayed photo from pixel data representing the image in the displayed photo, comparing the image characteristics of the displayed photo to image characteristics from a plurality of reference photos, each of the plurality of reference photos having an established date, and estimating the date of the displayed photo based on the similarity of the image characteristics of the displayed photo to one or more the image characteristics of the reference photos. A data structure (such as a family tree) having a plurality of data nodes, each data node representing one or more data records having a subject associated with one or more dates, is displayed at the user interface. The system and method determine whether there is a relationship between the displayed photo and a data record at one or more of the data nodes, based on the estimated date of the displayed photo, identify at the displayed data structure one or more data nodes that have a relationship to the displayed photo based on the dates associated with the subject of the one or more data nodes, and receive tagging information at a user interface concerning the displayed photo based on the identified one or more data nodes.

BRIEF DESCRIPTION OF THE DRAWINGS

A more complete understanding of the present invention may be derived by referring to the detailed description of the invention and to the claims, when considered in connection with the Figures.

DETAILED DESCRIPTION OF THE INVENTION

Figure 1:
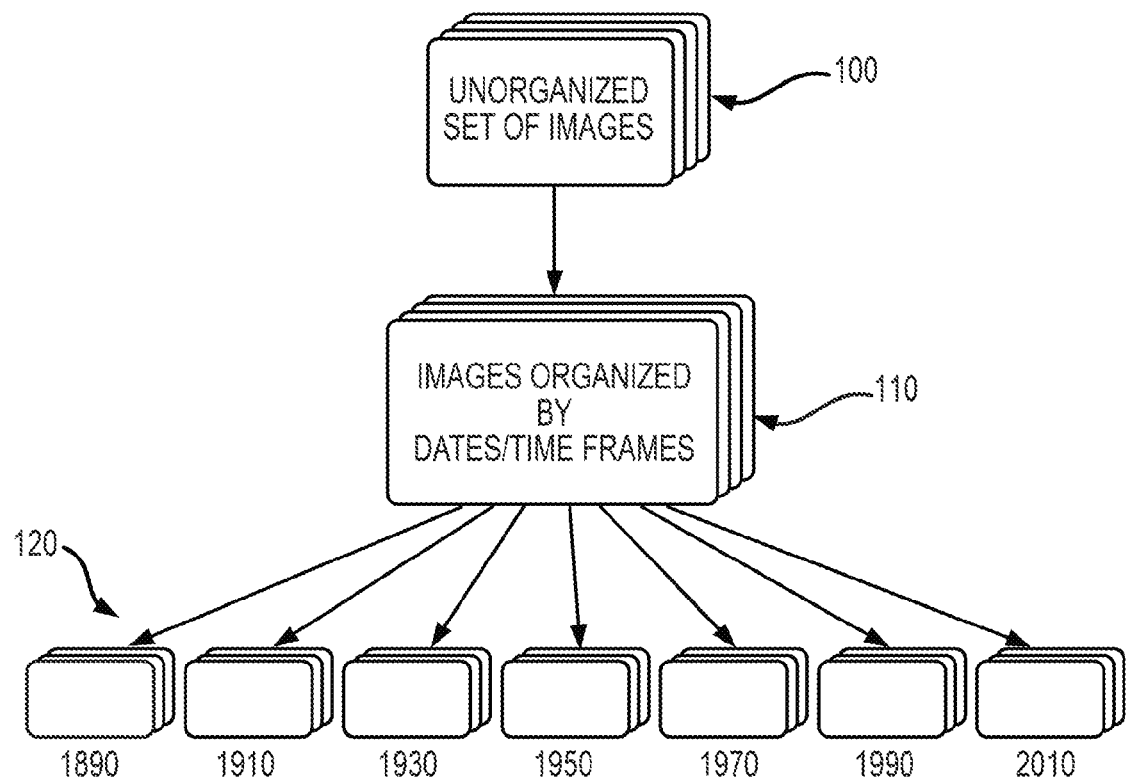
FIG. 1 illustrates identifying and organizing a set of photos in accordance with an embodiment of the invention.

There are various embodiments and configurations for implementing the present invention. Generally, embodiments provide systems and methods for estimating the date of a photograph (the date that the image in the photograph was captured). By estimating the date of a photograph, identifying data for the photograph may be inferred, e.g., by a user viewing the photograph.

In one embodiment, a photo can have its date estimated by comparing its image characteristics to image characteristics of a collection of reference photos. The reference photographs have established dates, permitting a model to be built that associates various image characteristics to the established dates of the reference photos. In one case, image characteristics include image characteristics taken from processed pixel data, such as image data reflecting the hues, saturation, intensity, contrast, sharpness and graininess in the underlying photo (and its image). Some characteristics (e.g., hues, saturation and intensity) are taken from color space or model data, such as the HSI (hue, saturation and intensity) color model data. Some characteristics (sharpness and graininess) can be taken from frequency domain data, e.g., pixel data that has been converted into a Fourier series and using frequency components to establish the degree of sharpness and graininess.

In some embodiments, the image characteristics of a large sampling or collection of photographs with known dates can be determined in order to build a model. In a specific embodiment, the collection of photographs are from data records stored in connection with genealogical records. In particular, users of a genealogical data can set up family trees, with each person or node in the trees having records, such as photographs, stored for that person. Such records may include tagging information which has been entered by a person familiar with the family tree, with the tagging information including the date that a reference photo was taken. As a result of many people storing records (including photographs) for many family trees, the stored photographs are likely to be numerous and also span across many years. By processing the image characteristics for the stored photographs, a model can be built which can be used to estimate the date of a photograph based on the image characteristics of the reference photographs and dates that are known or established for those reference photographs. In some cases, the estimated date may be a timeframe or a date range (e.g., "January, 1920," "between Jan. 1, 1970 and Jan. 1, 1975," or "on or before Jan. 1, 1990").

Once the date of a photo has been estimated (using the model), a user can then enter identifying (tagging) information for the photo, if such data can be inferred or determined based on the estimated date. For example, in one embodiment, a user can view a displayed photograph and a data structure, such as a family tree, on a user interface. Based on the estimated date of the displayed photo, the user (who would typically be familiar with or may have created the family tree), may be able to determine the identity of a person (or people) in the photograph based on the estimated date and the people in the family tree that were alive on the estimated date.

Thus, an estimated date of a photograph can be used either to generally organize photos by estimated dates (e.g., arrange the photos by estimated date or time frame), or to more specifically identify a photo by providing context to the photo and facilitate or aid a user in adding information on a person (name), place, and/or event to which the photo pertains. With such information or tags, photos can later be retrieved based on search terms relating to people, places or events.

In other embodiments, basic image information (rather than processed pixel data) can also be used to estimate or determine the date of a photograph. For example, image data such as aspect ratio and type of photo border could be used. As another example, metadata stored with a digital photograph (date, type of camera, etc.) could be accessed and also used to estimate the date of a photo.

In all these various embodiments, the estimation or determination of the date of a photo can be used by a user to facilitate the entry of identifying information in order to organize photos and/or make them accessible based on identifying information.

Referring now to FIG. 1, there is illustrated a set of untagged photos or images 100 that can be identified and organized according to features of the present invention. The photos 100 are not organized (or identified), and can relate to numerous people, events, places or things for which a user may not have information or other means to identify the photos. In some instances the photos may be hardcopy prints that may have been stored in a box or album, and may have many different formats, styles and sizes (e.g., from having been taken over many years). As will be more fully described below, if the photos are hardcopies, the photos are scanned and digitally stored. In some instances, the user may have photos already in digital form, either because they have been previously scanned or they may have been originally taken with a digital camera and downloaded to a storage device.

In accordance with some embodiments herein, information concerning the photos is obtained so that the images can be identified and stored as categorized or organized images 110. It should be appreciated that by being organized, the photos are not necessarily stored together, but rather are classified or "tagged" with identifiers. As illustrated in FIG. 1, tagged photos might be classified or organized into groups 120. In the illustrated embodiment, the photos are organized by dates or timeframes, e.g., photos in twenty year time frames are categorized together in groups identified by the years 1890, 1910, 1930, 1950, etc. However, as should be appreciated, these are only examples and, depending on the confidence in date estimation, photos could be organized by individual years or perhaps even months. Further, while photos are shown in FIG. 1 as organized by dates, as will be discussed later, in some embodiments, date estimation is used as a first step in tagging photos with other identifying information (a person in the photo, where it was taken, when it was taken, or an event that it captures), and in such a way the photos can be retrieved and viewed by using those other identifiers. As an example, a user might want to view all photographs concerning his or her grandfather and, using the grandfather's name as an identifier, retrieve all digitally photos that have been tagged with the grandfather's name. Thus, each of the groups of photos 120 may have a common tag or identifier (such as a timeframe). However, other tags (people, place, event, etc.) could be used to organize the photos. Further, in some instances, a photo may have multiple tags (for example, multiple people, events, locations or a combination thereof) and one photo may be assigned to or classified in more than one of categories in the groups 120.

While the described embodiments relate to tagging still photos (as illustrated in FIG. 1), it should be appreciated that the invention has application to other forms of images, such as motion pictures and videos.

Figure 2:
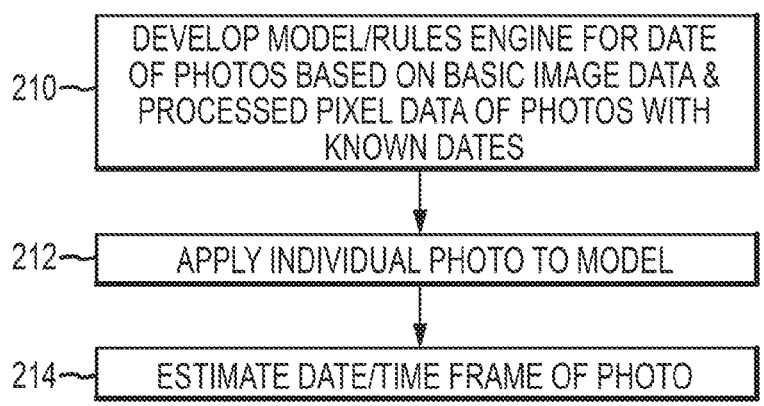
FIG. 2 is a simplified flow diagram illustrating a method for estimating the date of photographs in accordance with one embodiment of the invention.

Referring now to FIG. 2, there is seen a simplified flow diagram illustrating a process for estimating the date of a photograph in accordance with one embodiment of the invention. At step 210, a model or rules engine is developed based on a collection of reference photographs with known or established dates.

As mentioned earlier, the reference photographs might be those stored in connection with genealogical records, in order to provide a large sampling of photographs over many years. For example, photographs stored in database systems that permit users to develop and maintain family trees (and to store photographs and other records), such as systems operated by Ancestry.com (Provo, Utah), could be used. Such database systems might store hundreds of thousands (if not millions) of photographs that have been provided in digital form by users of those systems, with the photographs stored at nodes representing people and having tagging information that would typically include a date (or approximate date) that the photograph was taken (along with other information, such as people in the photograph, location, event, and so forth). Photographs stored in connection with genealogical information and family trees are particularly useful for purposes of developing a model since the photos would typically extend across many years as part of family trees (from the time of the earliest photographs in the mid-1800s up to the present time).

However, other databases could be used as long as the sampling of photos is sufficiently large.

Figure 3:
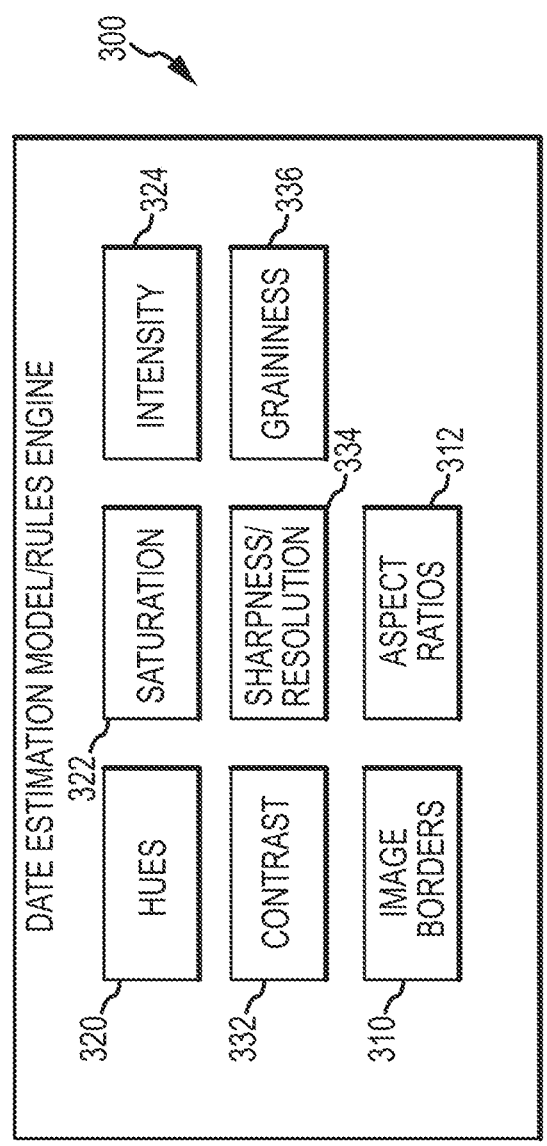
FIG. 3 illustrates a date estimation model or rules engine that could be used in the process of FIG. 2.

In connection with step 210, two general types of image characteristics are identified from the reference photographs, namely (1) basic characteristics of the image and (2) characteristics from processing pixel data in the image. These characteristics are illustrated in FIG. 3, which show various characteristics that are built into a date estimation model or rules engine 300.

The first type of general image characteristics (basic image characteristics) include image border characteristics that are illustrated by the rules category 310, and aspect ratio characteristics that are illustrated by the rules category 312. As to image border characteristics, borders and border styles have evolved over time depending on the type of camera and the photo finishing process used. White borders were popular in the past, with varying border sizes and shapes that often depended on the type of film or photofinishing process used during the timeframe that the photograph was taken. In addition, and during certain periods of time, scalloped borders and other border effects were popular on print photos. White borders began to disappear altogether as digital photography became popular.

Aspect ratios (relationship of width to height of a camera image) have also evolved over time, and often depend on the type of film used (prior to digital photography). For example, INSTAMATIC cameras used in the 1960s produced 3.5 inch× 3.5 prints. Cameras popular in the 1970s used film cartridges that produced 3.5"×5" prints.

The second type of general image characteristics relates to the image pixels that result from digitally processing an image. As illustrated in FIG. 3, rules can be developed for hues or colors (rules category 320), saturation (rules category 322), intensity (rules category 324), contrast (rules category 332), sharpness or resolution (rules category 334) and graininess (rules category 336). Further details on processing and identifying these characteristics will be provided later in connection with FIG. 8.

The various characteristics are used to develop the model 300 (FIG. 3) which can then be later used to estimate the date of a given photo based on that photo's characteristics in relation to characteristics (built into model 300) of references photos and their known dates.

FIGS. 4A through 4D show exemplary photographic characteristics over time in order to illustrate how a model, such as the date estimation model 300 in FIG. 3, could be built using the various image pixel characteristics 320-324 and 332-336 illustrated in FIG. 3.

Figure 4A:
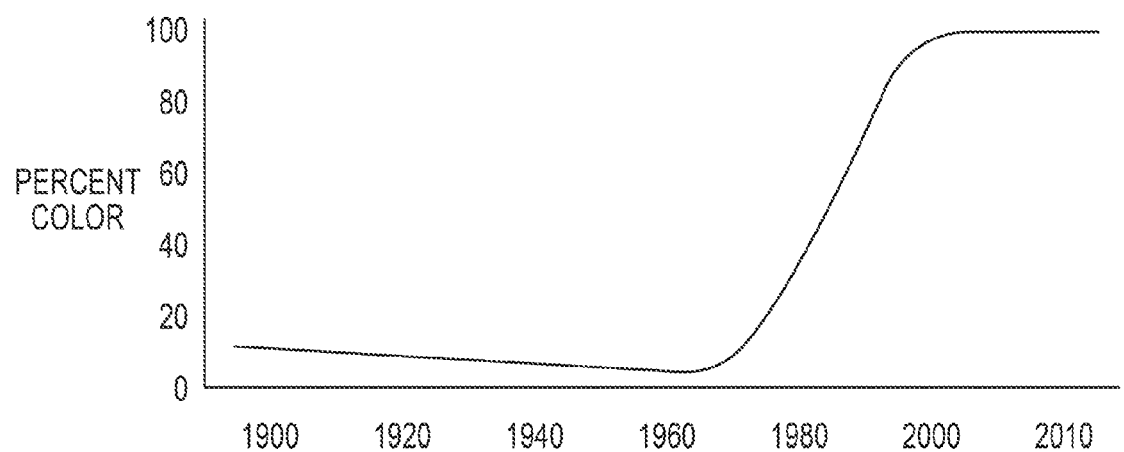
FIGS. 4A through 4D illustrate exemplary image characteristics of photographs that could be used in developing the date estimation model seen in FIG. 3.

In FIG. 4A, there is a graph illustrating the presence of colors (beyond black and white) in photos from 1900 to 2010. As illustrated, some very small amounts of certain colors (yellow and sepia tones) appear in photos taken prior to the 1960s, as a result of aging and exposure of black and white print photos to the environment (such colors are greatest in the oldest photos). Color photographs taken by consumers did not appear until about 1960. The graph illustrates the significant increase in colors beginning in the 1960's, to nearly 100% by the 1980s, resulting from the almost exclusive use of color photography in more recent years.

Figure 4B:
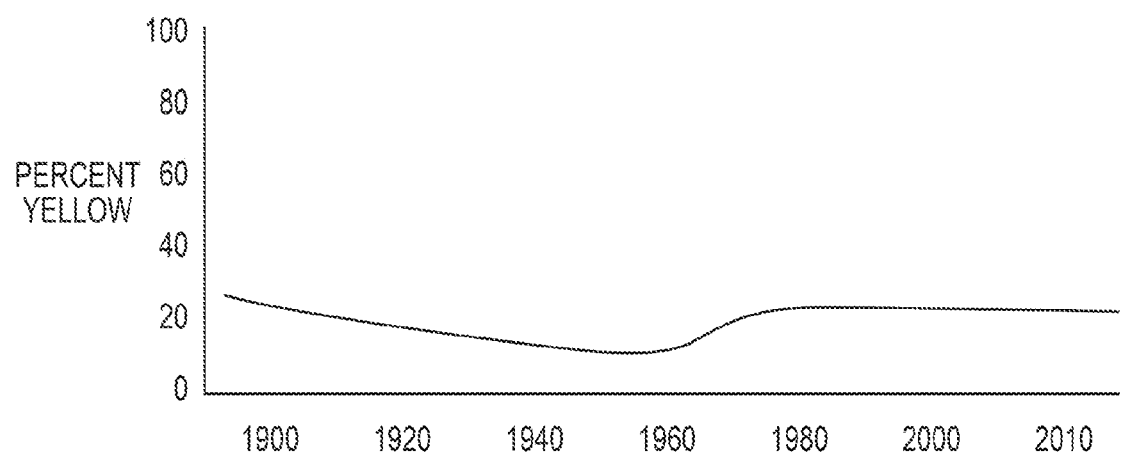

In FIG. 4B, there is a graph illustrating the presence of the color yellow in photographs. Yellow can be a good indicator of aging, since old black and white photos printed on paper will tend to yellow over time. Thus, from 1900 (and before) to the present, yellow exists to a degree in many photographs, with the yellow appearing in the oldest photographs but decreasing (less yellowing in more recent photographs) until the 1960s, when more yellow appears again (due to the presence of yellow along with other colors in modern color photos).

Figure 4C:
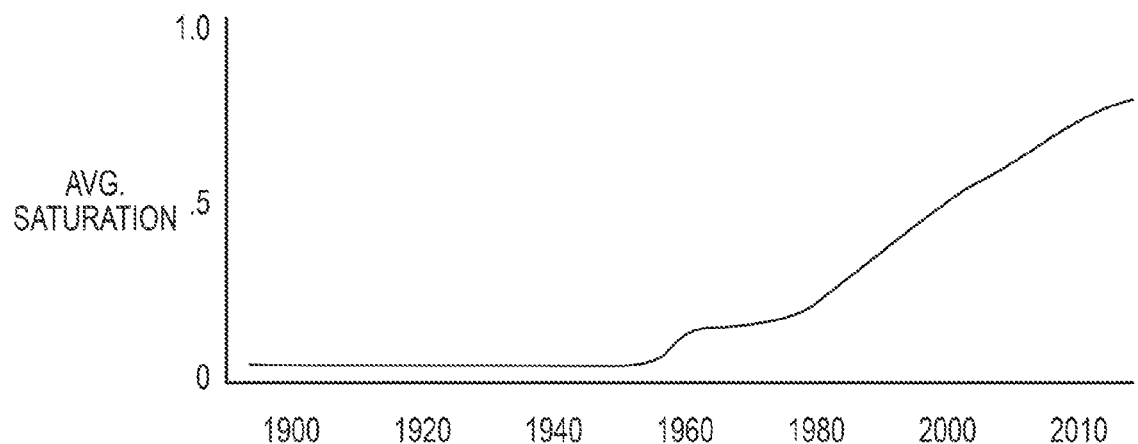

In FIG. 4C, there is a graph illustrating saturation in photos. Saturation typically identifies the degree or vividness of color and, as seen in FIG. 4C, saturation is not present in most photographs until the 1960s, when color photos began to more widely appear. In the mid 1980s, saturation began to increase as color photography improved (early color photographs often had washed-out and low saturation colors, but as color film technology improved and as digital photography became more common, colors became more vivid and saturated).

Figure 4D:
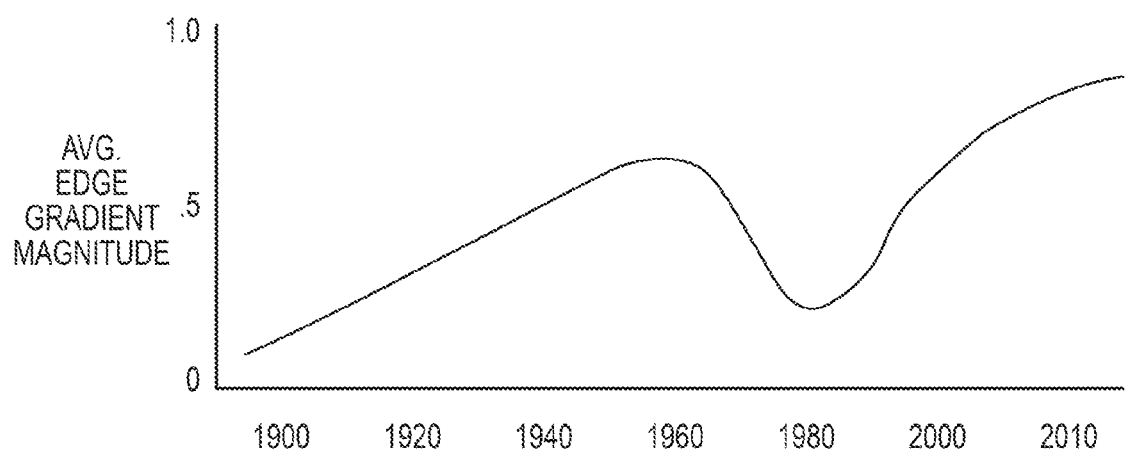

In FIG. 4D, there is a graph illustrating sharpness in photographs. This characteristic is usually determined by the sharpness of edges in the objects appearing in photographs, with sharpness gradually increasing from 1900 until about 1970 (as technical improvements in black and white photographs resulted in improving sharpness). Sharpness then decreased briefly after 1970 as color photography first became prevalent, and then as the technology used in color photography improved (dramatically with digital photography), the degree of sharpness in photos likewise increased. Sharpness can be determined by the extent of high frequency signals in pixels at edges in digital images, is often measured as edge strength or edge gradient magnitude, and will be more fully described later in conjunction with FIG. 8.

Of course, FIGS. 4A-4D are only a few possible pixel data characteristics among those associated with rule categories in FIG. 3. Further, many other pixel data characteristics could be evaluated beyond those illustrated in FIG. 3. For example, certain colors change over time because of fashion and other considerations, and thus the prevalence of one specific color over another could also be used to determine the age of a photo. In some embodiments, objects appearing in photos could be recognized (such as furniture, automobiles, clothing, etc.) and the color of those items in a photograph could be developed into rules for estimating the date of a photo (along with other basic image characteristics and pixel data characteristics).

The date estimation model 300 in FIG. 3 could use various methods and algorithms for evaluating and weighting various characteristics based on the analysis of the reference photographs over time (based on predictive or probabilistic rules engines, intelligent or neural networks, or other techniques).

In one embodiment, for any given reference date (or time frame), the image characteristics that are likely to be present for photographs on that date are established, based on average characteristics of the reference photos for that same date or time frame. As an example, for any given reference date or year (say 1950), each of a plurality of image characteristics (e.g., hues, saturation, intensity, contrast, sharpness and graininess) can have values assigned for that year based on the observed values in the reference photos, with the observed values combined into an average (and discarding individual photo values that are too far removed from the average to be reliable). Then an undated photo having values for its image characteristics closest to one reference date (as opposed to other reference dates) is given that year as its estimated date.

In other embodiments, the model can be implemented as a more complex set of rules and algorithms, that assign weights to each of multiple image characteristics based on the analysis of the reference photos and their established dates. Values for image characteristics of an undated photo are provided to the model, and an estimated date is provided as an output based on the weighted characteristics built into the model rules and algorithms. As examples only, Bayesian networks and Gaussian mixture models could be employed using multiple image characteristic data (as associated with established dates of reference photos) at step 210 to classify photos based on the observed patterns of image characteristics over time. As examples only, various methods for pattern classification of images based on Bayesian networks, Gaussian mixture models and other probabilistic and predictive techniques are described in U.S. Pat. No. 7,305,132, issued to Rita Singh et al., U.S. Pat. No. 7,991,715, issued to Jeremy Schiff et al., U.S. Pat. No. 7,961,955, issued to Thomas Minter, U.S. Pat. No. 8,050,498, issued to Gregg Wilensky et al., and U.S. Pat. No. 8,103,598, issued to Thomas Minka et al., which are each hereby incorporated by reference.

Returning to the process in FIG. 2, when a photo is presented for date estimation, the characteristics of the photo are identified and applied (step 212) to the date estimation model 300, and the result of the analysis at the model 300 yields an estimated date (or time frame) for the photo at step 214.

Figure 5:
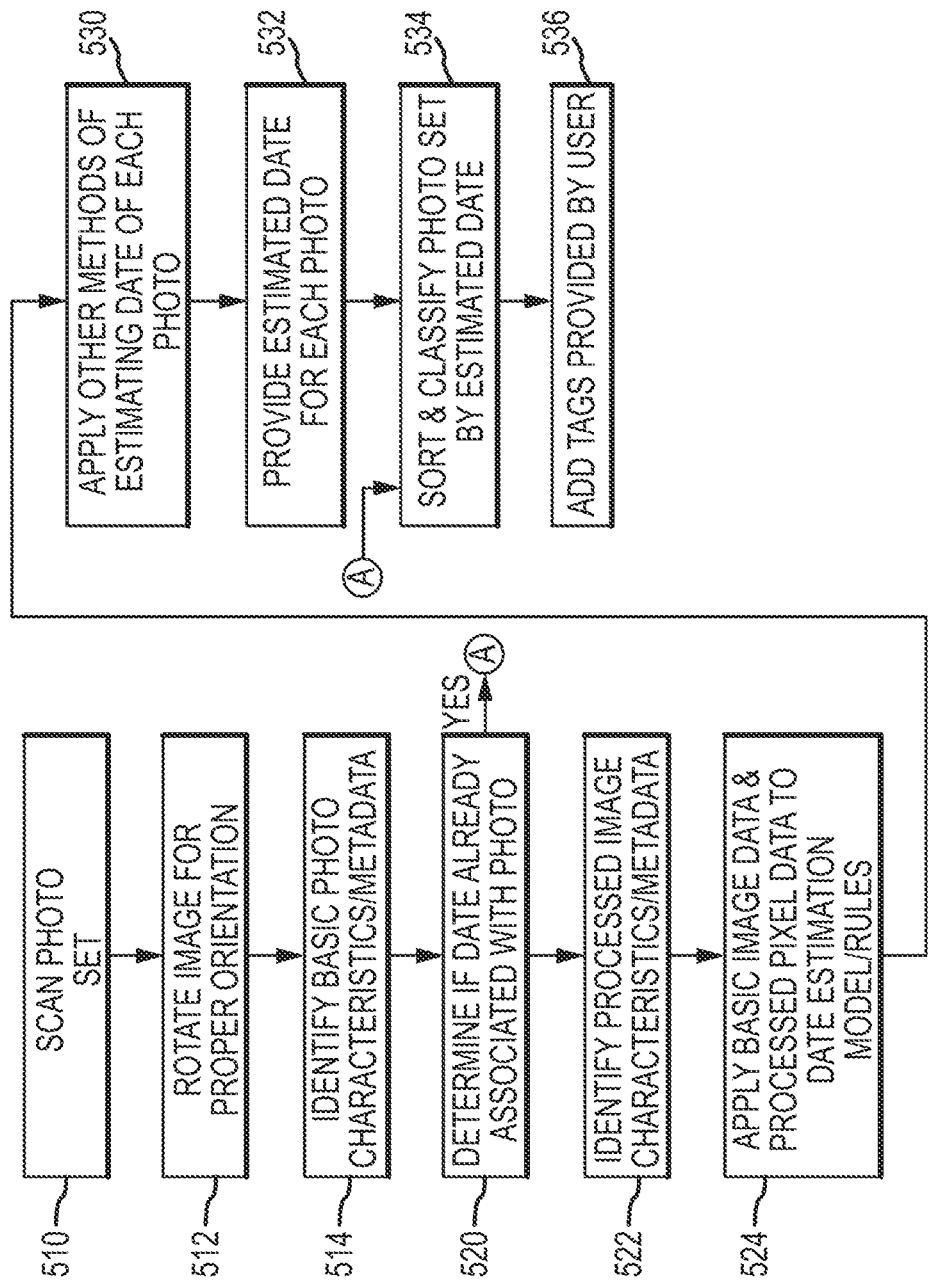
FIG. 5 is a detailed flow diagram illustrating a method for estimating the date of photographs and using the estimated date to tag photographs, in accordance with an embodiment of the invention.
Figure 6:
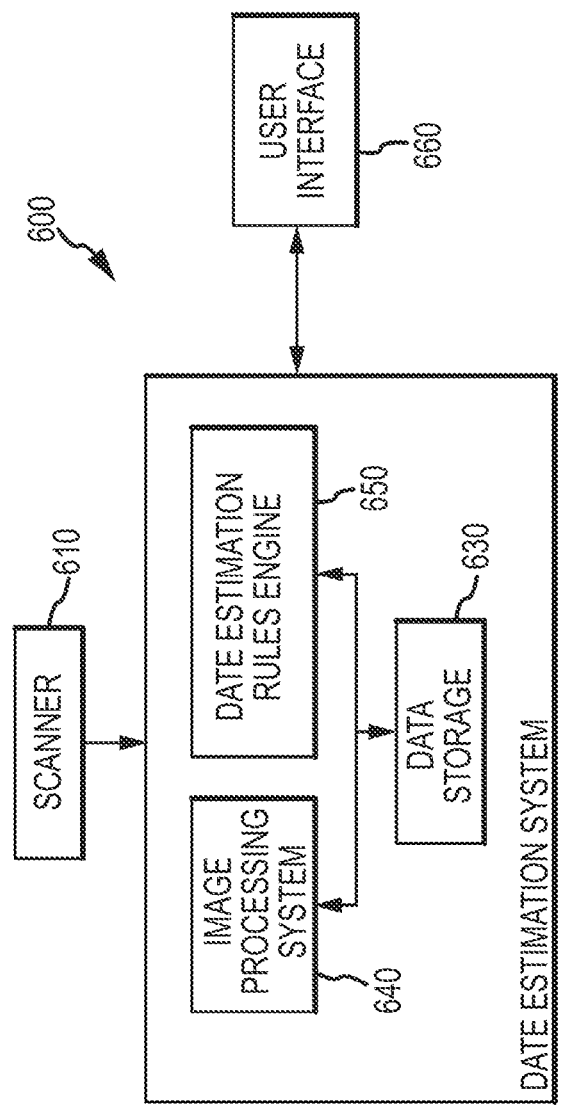
FIG. 6 is a block diagram of a system for estimating the date of photographs and tagging those photographs with identifying information.

FIG. 5 illustrates a more detailed process for estimating the date of a photo and, in accordance with some embodiments of the invention, for identifying the photo with tagging information. The process of FIG. 5 could be implemented at a system, such as a system 600 illustrated in FIG. 6. The system 600 receives digitally scanned photos from a scanner 610, with the scanned photos stored in a database or data storage device 630. As noted earlier, in some cases, photos or images may be received by the system 600 in digital form without having to be scanned (e.g., photos that were originally taken with a digital camera). In the present embodiment, family tree information is also stored in storage device 630, for reasons that will be described in greater detail later.

Also seen in the system 600 is an image processing system 640 for processing and analyzing various data and characteristics associated with photos digitally scanned at scanner 610, and a rules engine 650 which implements the date estimation model 300 seen in FIG. 3. A user interface 660 permits a user to interact with the system 600, and may include various input and output devices (e.g., keyboard, mouse, display, and so forth).

Returning to FIG. 5, the user of system 600 might have a stack of hardcopy print photos which are not organized and for which identifying information is missing or incomplete. The photos are scanned to provide digital copies at step 510, using a conventional scanner, such as the KODAK i600 Series Document Scanner or similar system. The scanned images from the scanner are stored in data storage device 630. As mentioned earlier, in some instances digital images may be available (rather than print copies of photos), and in such case, the digital photos could be inputted from a storage medium such as a compact disc, from a digital camera, or from other sources, such as a server storing photos at an online photo album website.

At step 512, each image is rotated, if necessary, to put the photo in the proper orientation. As will be discussed below, each scanned image can be viewed individually on a display to permit it to be associated with to a corresponding node of a family tree. Having the proper orientation of the photo will make it easier and more efficient to view each photo. Software systems for determining the proper orientation of a photo are known, and are described, for example, in U.S. Pat. No. 7,215,828, issued to Jiebo Luo et al. and U.S. Pat. No. 8,036,417, issued to Andrew Gallagher et al.

At step 514, basic photo or image characteristics are determined or identified by the system 600. Such characteristics were described earlier and would include image border and border style, and the aspect ratio of the image. In an alternative embodiment, metadata associated with the photo might also be identified at step 514. Metadata would typically only apply to photos taken with a digital camera, and could include data automatically captured at the time the photo was taken, such as the date of the photo. In other embodiments, the system 600 might be configured to look for a date that might be printed on a photo (e.g., photos originally taken with film and provided as hard prints, where dates might have been put on hard prints by a photo finisher when the photographic film was processed). Rotation of the image at step 512 facilitates the location of printed or handwritten dates, and locating and capturing such dates (as well as other techniques for estimating or determining the date of photographs from basic image characteristics) are described in more detail in U.S. Pat. No. 8,036,417, issued to Andrew Gallagher et al., which is hereby incorporated by reference.

At step 520, the system then determines if data captured at step 514 has already established a date, thus eliminating the need for analyzing photo characteristics (e.g., if the date is in metadata stored with a digital photo or has been captured from a date printed on the photo). If so, various steps in the process can be bypassed (as indicated by flow point A) and the photo could be sorted or categorized using the already established date.

At step 522, the system next processes pixel data in order to identify pixel data characteristics of the photo (such as hues, saturation, intensity, contrast, sharpness and graininess), as described earlier in conjunction with FIG. 3, and using a process to be more fully described later in conjunction with FIG. 8. At step 524, the system applies the basic image characteristics (from step 514) and the pixel data characteristics (from step 522) to the model 300 in order to determine an estimated date for the photo.

In some embodiments, as illustrated at step 530, other methods for estimating a date could also be used in addition to the analysis of basic image and processed pixel data characteristics. Such methods could include object and event recognition (such as the model year of an automobile, or known dates associated with events or people represented in the photos, as described in aforementioned U.S. Pat. No. 8,036,417, issued to Andrew Gallagher et al.).

As yet another example, clothing could be used for estimating a date. For example, if a photo with a known date has a person wearing a specific item of clothing (e.g. coat, dress, hat) and that same person is wearing the same item of clothing in a second photo, it is likely the photos have been taken in the same general time frame and the second photo can be given an estimated data (or timeframe) based on the known date of the first photo. This is particularly true for children where a child is unlikely to be wearing the same clothing beyond a one or two year time window. Techniques for recognizing people (based on facial recognition), which can be used to identify a person who may be wearing the same clothing in different pictures, are referenced later in this description.

A step 532, the estimated date of the photograph is provided by the system. Where a photo set has been scanned and organized, the photos could be organized by estimated date or timeframe at step 534. The user can then view the organized photos and use the estimated dates to provide tagging information for each photo, step 536. In other embodiments, the photos might have estimated dates determined for each photo individually and tagging information provided by a user as each date is estimated.

Figure 7:
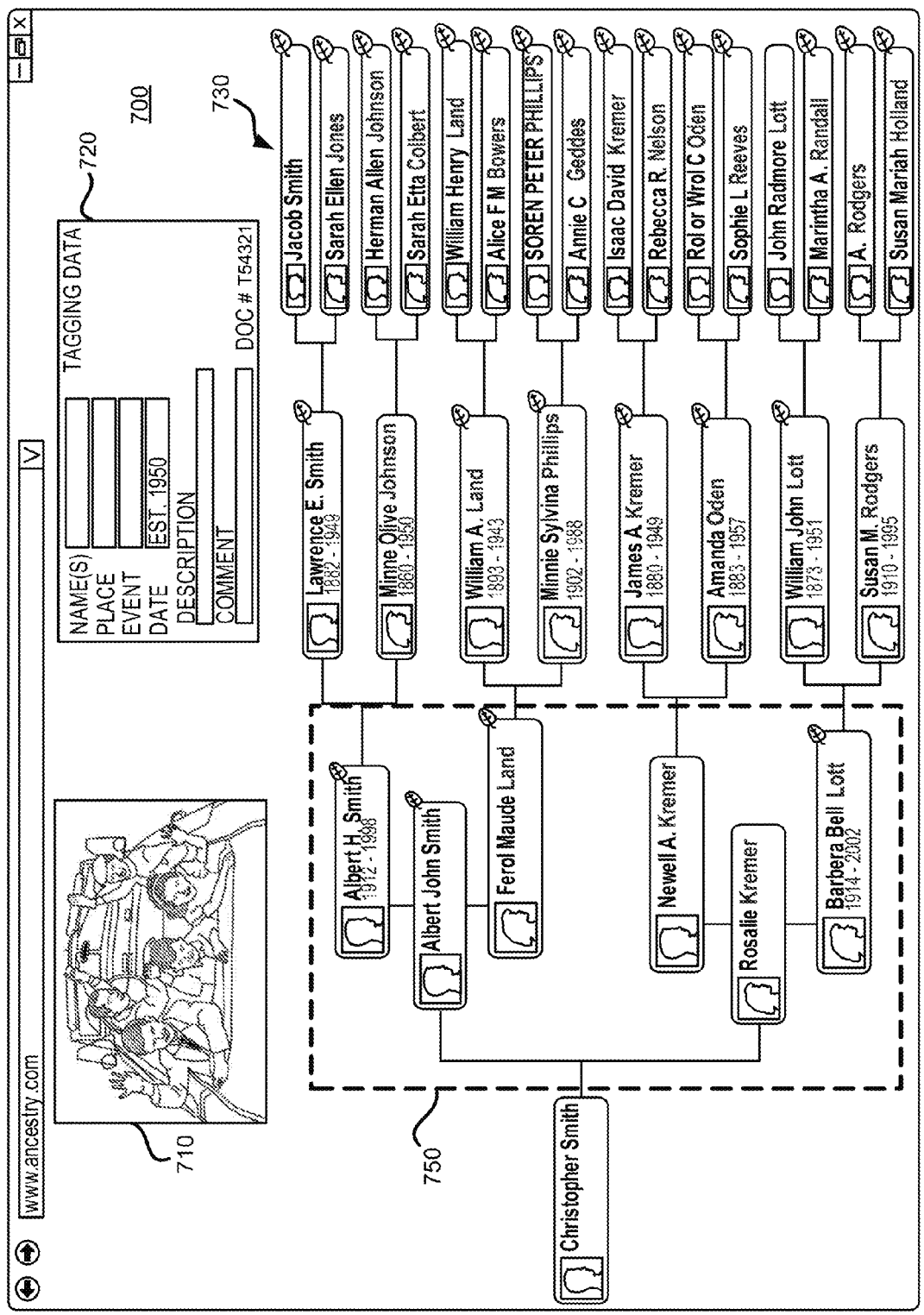
FIG. 7 illustrates a display on a user interface, used in implementing the process of FIG. 5.

The entry of tagging information for a photo according to one embodiment is illustrated in FIG. 7. A display screen 700 (as might be presented to a user at the user interface 660) includes a photo 710 for which a date had been estimated, and a tagging window or box 720 which is used to enter tagging information. Also displayed on the screen is a family tree 730, which might be stored, for example, at data storage device 630.

The family tree 730 could be created and stored in a known manner. Family tree information may include various data records for each person represented in the family tree, including basic information (such as name, birth date, birthplace, date of death and similar information taken from historical records and vital statistics), various documents and records (including photos) that have been digitally scanned and stored in association with each person, and the relationships between people (nodes). The structure of a family tree and its represented information, and the manner in which various records (including images and photos) can be stored in association with each person or node in a family tree, are known and are described, for example, in commonly owned U.S. patent application Ser. No. 13/049,671, filed Mar. 16, 2011, by Donald B. Curtis, for METHODS AND SYSTEMS FOR IDENTIFICATION AND TRANSCRIPTION OF INDIVIDUAL ANCESTRAL RECORDS AND FAMILY, U.S. patent application Ser. No. 13/035,816, filed Feb. 25, 2011, by Matt Rasmussen, et al., for METHODS AND SYSTEMS FOR IMPLEMENTING ANCESTRAL RELATIONSHIP GRAPHICAL INTERFACE, and U.S. patent application Ser. No. 12/511,009, filed Jul. 28, 2009, by David Graham et al., for SYSTEMS AND METHODS FOR THE ORGANIZED DISTRIBUTION OF RELATED DATA, each of which is hereby incorporated by reference.

The identification or tagging of a photo (step 536) with the use of a family tree could be done by a user, for example, at a keyboard at the user interface 660, and based on the estimated date of the photo. As illustrated in FIG. 7, the system has automatically populated the estimated date of the photo at the tagging window 720. The user views the family tree 730 and could infer certain things about the photo, such as a person (name), place or event, which could then be entered as a tag by the user at the tagging window 720.

In one embodiment, where a definite association with a person at a family tree node is made, the user might also store the photo with other records at the family tree node for the recognized person. As one example only, a photo could be placed at a node in the family tree 730 (and thus stored in data storage device 630 in association with other data for the person represented at the node) using a "drop and drag" technique, such as described in commonly owned U.S. patent application Ser. No. 13/440,586, for SYSTEMS AND METHODS FOR ORGANIZING DOCUMENTS, filed on even date herewith, by Christopher Brookhart, which is hereby incorporated by reference.

Also, as an aid to the user, the system 600 could highlight or identify people in the family tree that were alive on the date of the photo, such as by the use of the graphical box 750 seen in FIG. 7. In some embodiments, the system 600 could employ techniques for estimating the ages of people in the photo based on the faces detected, in order to provide an even narrower selection of people in the family tree that might be in the photo (based on their ages at the time of the photo). Methods for detecting faces of people in photos and estimating the ages of those people are described in commonly owned U.S. patent application Ser. No. 13/440,811, for SYSTEM AND METHOD FOR ASSOCIATING A PHOTO WITH A DATA STRUCTURE NODE, filed on even date herewith, by Christopher Brookhart (and various publications cited therein), which is hereby incorporated by reference.

Figure 8:
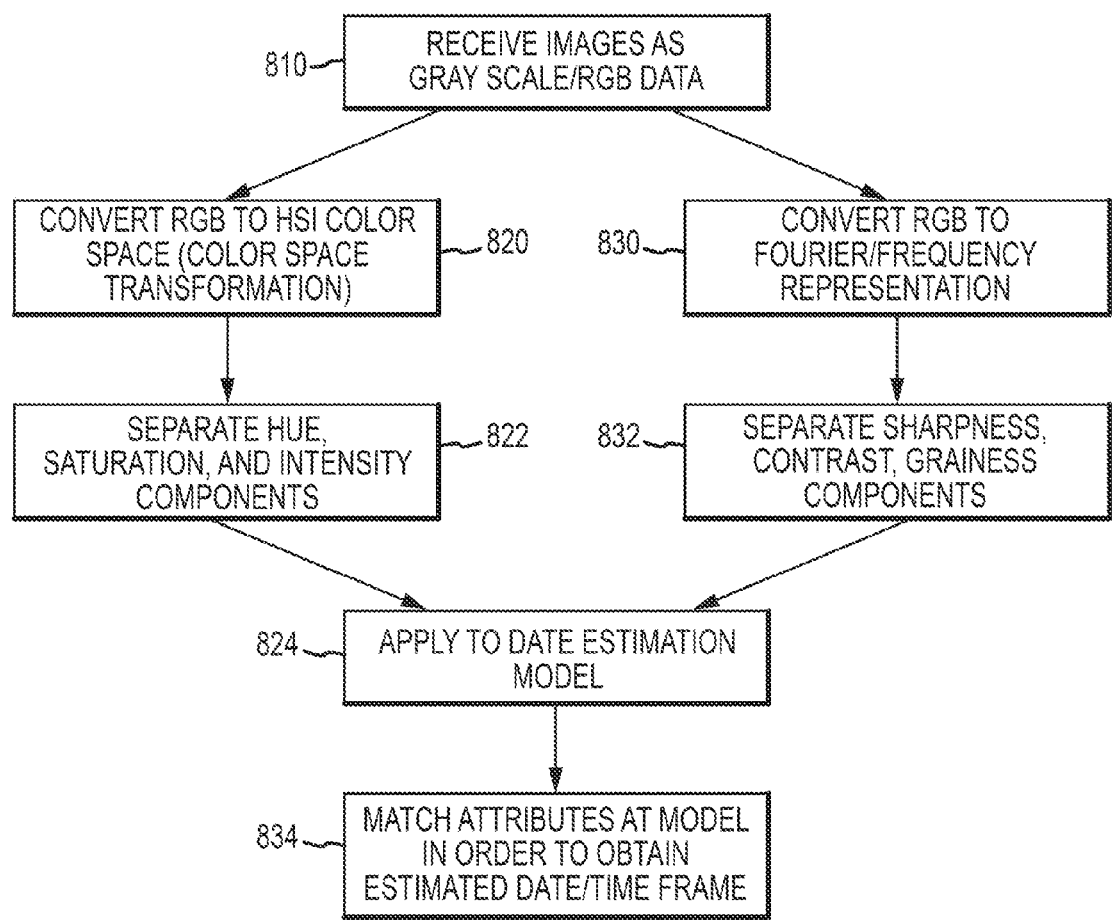
FIG. 8 is a flow diagram illustrating the use of pixel data characteristics in estimating the date of a photograph.

FIG. 8 is a flow diagram illustrating the processing of pixel data at image processing system 640 in order to identify image characteristics and apply those characteristics to the model implemented at the rules engine 650. At step 810, images are received at image processing system 640 in the form of pixel data. In the described embodiment, color photographs are represented by pixel data in the RGB color space, although images could be provided in other color space models, such CMYK, YIQ and so forth. Also, if black and white photos have been processed into pixel data, the image might be provided as a gray scale image.

The RGB image data is then converted into the HSI (hue, saturation and intensity) color model data (or the similar HSL or HSV color models). Systems for converting RGB image data into HSI, HSV and HSL image data are well known and described, for example, in U.S. Pat. No. 7,853,074 to Gregory Mischler, U.S. Pat. No. 7,583,838 to Jae-Moon Lee, and U.S. Pat. No. 5,870,139 to Anthony Smith et al., which are each hereby incorporated by reference. It should be noted that black and white images could be converted to HSI (e.g., for determining the degree of yellowness), although for purposes of merely discerning a black and white photo from a color photo, the gray scale data could be retained and applied to the rules engine 650.

The HSI image data is then separated into its various components (hue, saturation and intensity) at step 822 and the components provided to the date estimation model 300 (as implemented by rules engine 650) in order to estimate the age of the photo. It should be appreciated that the data could be complex and large for each image, given that each image might have millions of pixels, with each pixel represented by several bytes of data in order to carry information on each of the components of the color model. In setting up the date estimation model and applying images to the model, average or representative values of various HSI components for an entire image or portions of images could be derived and be sufficient for purposes of estimating the date of a photo. In addition pixel binning and histogram analysis could be used in developing values for various photographic characteristics (e.g. these illustrated in FIGS. 4A-4D).

HSI data could also be used for determining contrast (for both black and white images and for color images), with the model 300 built to have rules pertaining to the degree of blackness and whiteness (and gray tones between black and white), weighted to account for the age of the photo.

As the HSI color model data is identified and evaluated at steps 820 and 822, non-color characteristics of the pixel data may also evaluated. At step 830, the RGB model data (or gray scale data for black and white photos) is transformed into the frequency domain using a Fourier series, generally representing the frequency of the signals derived from each row (or column) scan of the image. The transformation into frequency domain data is useful to evaluate certain characteristics of the image, such as sharpness and graininess, with these characteristics generally represented by signals at certain frequencies. Transforming image pixel data into frequency domain data is known and described in the art, such as in F. Weinhaus, ImageMagickExamples—Fourier Transforms, ImageMagick Studio LLC, http://www.imagemagick.org/Usage/fourier/, U.S. Pat. No. 7,782,401, to Chih-Hsien Chou, U.S. Pat. No. 7,990,429, to Ikuya Saito, and U.S. Pat. No. 8,094,961, to Lester Ludwig.

In the described embodiment, both sharpness and graininess are determined for the photo to be dated. For sharpness, the edges of objects in an image are detected. The degree of sharpness at edges is indicated by the frequency of the component Fourier series signals at such edges (high frequency signals will indicate a sharp, crisp edge). Thus, by determining the presence (or lack) of such high frequency signals, the degree of sharpness or blurriness at the edges can be identified, as described aforementioned U.S. Pat. No. 7,782,401, to Chih-Hsien Chou, U.S. Pat. No. 7,899,256, to Fedorovskaya et al., U.S. Pat. No. 7,990,429, to Ikuya Saito, and U.S. Pat. No. 8,094,961, to Lester Ludwig, which are each hereby incorporated by reference. The average edge sharpness or strength (edge gradient magnitude) of the photo can be measured.

For graininess, the model determines the degree of noise (high frequency signals) in frequency domain data across an image (rather than at its edges), as described (as examples only) in U.S. Pat. No. 6,373,992, to Kimitoshi Nagao and U.S. Pat. No. 6,801,339 to Wataru Ito, which are each hereby incorporated by reference.

The average sharpness and the average graininess of a photo to be dated are calculated at step 832, and then applied to the date estimation model at step 824. Based on the application of the photo to the estimation model (and the comparison of the color and other attributes to the weighted attributes of the reference photos and their known dates, as represented in the model), the matched attributes provide an estimated date for the photo at step 834.

While use of HSI (or HSL or HSV) color spaces/models is illustrated in the process of FIG. 8, other forms of representing and analyzing color could be used. For example, color histograms could be used in developing model 300 and in matching photo characteristics in order to estimate the date of a photo (at step 834).

As should be appreciated, the techniques applied to pixel data for a photograph to be dated as described above (such as separating HSI data into its hue, saturation and intensity components and transforming RGB data into frequency domain data) could be used as well in analyzing reference photos for purposes of building the date estimation model 300. Further, in some embodiments, as individual photos have their dates estimated using the model 300, and particularly if an actual date is determined at step 520, the dates of photos (and their underlying characteristics) could be provided as feedback in refining the model 300.

Figure 9:
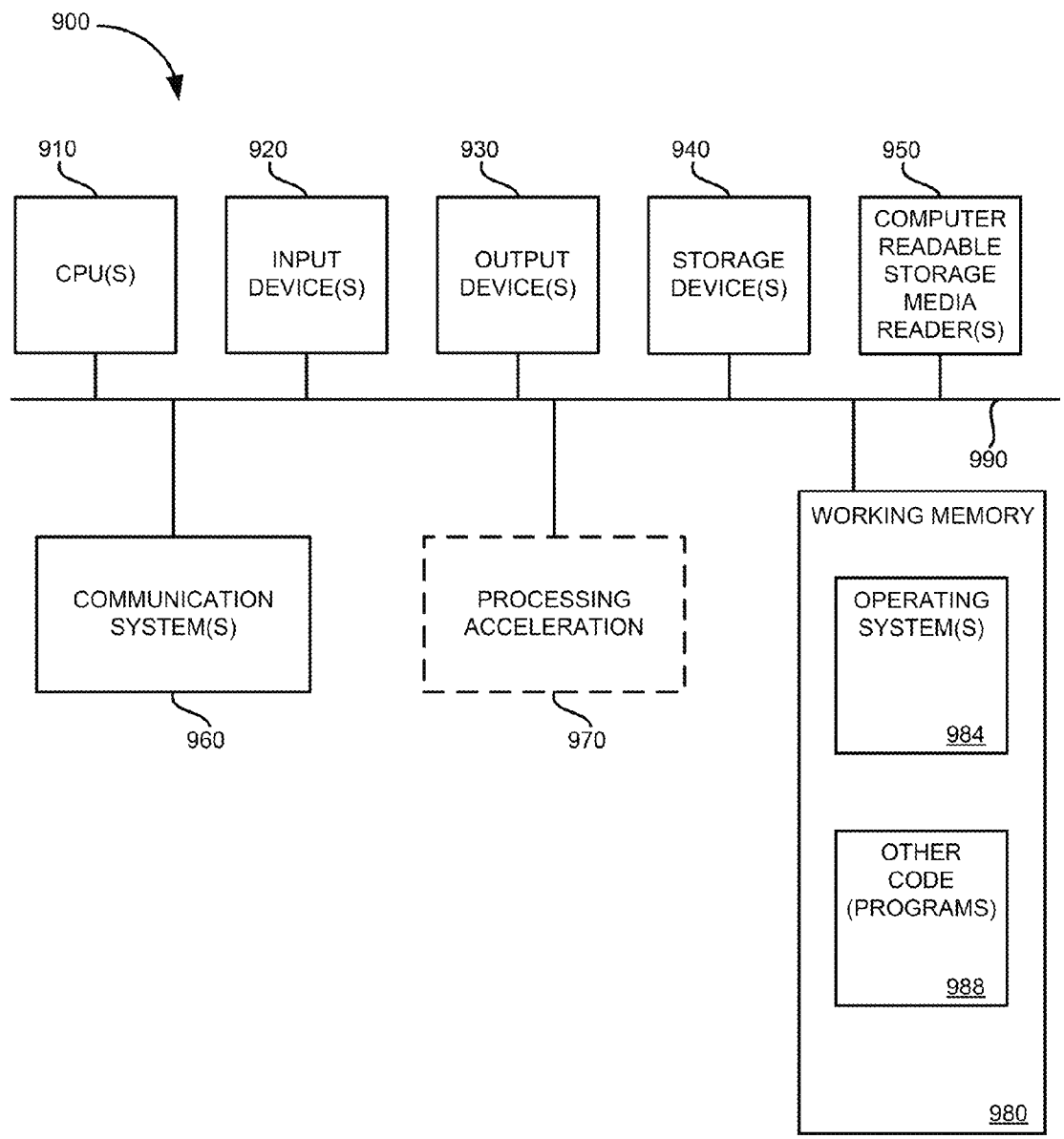
FIG. 9 is a block diagram illustrating an exemplary computer system upon which embodiments of the present invention may be implemented.

FIG. 9 is a block diagram illustrating an exemplary computer system upon which embodiments of the present invention may be implemented. This example illustrates a computer system 900 such as may be used, in whole, in part, or with various modifications, to provide the functions of database or data storage device 630, image processing system 640, rules engine 650, and user interface 660, as well as other components and functions of the invention described herein.

The computer system 900 is shown comprising hardware elements that may be electrically coupled via a bus 990. The hardware elements may include one or more central processing units 910, one or more input devices 920 (e.g., a mouse, a keyboard, etc.), and one or more output devices 930 (e.g., a display device, a printer, etc.). The computer system 900 may also include one or more storage devices 940, representing remote, local, fixed, and/or removable storage devices and storage media for temporarily and/or more permanently containing computer-readable information, and one or more storage media reader(s) 950 for accessing the storage device(s) 940. By way of example, storage device(s) 940 may be disk drives, optical storage devices, solid-state storage device such as a random access memory ("RAM") and/or a read-only memory ("ROM"), which can be programmable, flash-updateable or the like.

The computer system 900 may additionally include a communications system 960 (e.g., a modem, a network card—wireless or wired, an infra-red communication device, a Bluetooth™ device, a near field communications (NFC) device, a cellular communication device, etc.). The communications system 960 may permit data to be exchanged with a network, system, computer, mobile device and/or other component as described earlier. The system 900 also includes working memory 980, which may include RAM and ROM devices as described above. In some embodiments, the computer system 900 may also include a processing acceleration unit 970, which can include a digital signal processor, a special-purpose processor and/or the like.

The computer system 900 may also comprise software elements, shown as being located within a working memory 980, including an operating system 984 and/or other code 988. Software code 988 may be used for implementing functions of various elements of the architecture as described herein. For example, software stored on and/or executed by a computer system, such as system 900, can be used in implementing the process seen in FIGS. 2, 5 and 8 and the logic in the rules engine 650.

It should be appreciated that alternative embodiments of a computer system 900 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the date estimating system 600 may be implemented by a single system having one or more storage device and processing elements. As another example, the system 600 may be implemented by plural systems, with their respective functions distributed across different systems either in one location or across a plurality of linked locations.

Moreover, while the various flows and processes described herein (e.g., those illustrated in FIGS. 2, 5 and 8) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for estimating an image capture date of a photo, comprising:

identifying, by a processor, image characteristics of an undated photo;

comparing, by the processor, the image characteristics of the undated photo to image characteristics relating to a plurality of reference photos, each of the plurality of reference photos having an established date, wherein the compared image characteristics comprise graininess and wherein graininess is represented by frequency domain data;

estimating, by the processor, an image capture date of the undated photo based on a similarity of the image characteristics of the undated photo to one or more of the image characteristics of the reference photos;

displaying at a user interface, by the processor, the undated photo;

displaying at the user interface, by the processor, a data structure having a plurality of data nodes, each data node representing one or more data records having a subject associated with one or more dates;

identifying at the displayed data structure, by the processor, one or more data nodes that have a relationship to the undated photo based on the estimated image capture date of the undated photo and the dates associated with the subject of the one or more data nodes;

displaying, by the processor, a tagging data entry window at the user interface for receiving tagging information from a user viewing the undated photo and the displayed data structure; and receiving, by the processor, tagging information at the tagging data entry window at the user interface concerning the undated photo based on the identified one or more data nodes.

2. The method of claim 1, wherein the image characteristics are characteristics of pixel data resulting from digital processing of an image in the undated photo.

3. The method of claim 2, wherein the image characteristics further comprise sharpness, and wherein sharpness is represented by frequency domain data.

4. The method of claim 2, wherein the image characteristics further comprise color, and wherein color is represented by an HSI (Hue, Saturation, Intensity) color model data.

5. The method of claim 2, wherein the pixel data comprises:

pixel data transformed into a Fourier series representing frequency domain data.

6. The method of claim 1, further comprising creating an estimation model for estimating image capture dates by:

determining, by the processor, the image characteristics of the reference photos;

assigning, by the processor, the image characteristics of the reference photos to reference dates; and developing, by the processor, rules for the estimation model for associating image characteristics of undated photos to image characteristics of the reference photos, based on the image characteristics of the reference photos assigned to reference dates;

wherein the step of comparing the image characteristics of the undated photo comprises applying, by the processor, the image characteristics of the undated photo to the rules developed for the estimation model.

7. The method of claim 1, wherein graininess is determined by the frequency of Fourier series signals represented across the image of the undated photo.

8. The method of claim 1, wherein the data structure is a family tree, and wherein the subject of each node is a person.

9. The method of claim 8, wherein the undated photo and the family tree are displayed together at the user interface.

10. The method of claim 1, wherein the data structure having a plurality of data nodes comprises a family tree, with each data node in the family tree associated with a person, and wherein the method further comprises:

storing the undated photo as a data record at the one or more identified data nodes that have a relationship to the undated photo.

11. The method of claim 1, wherein identifying image characteristics of the undated photo comprises calculating an average graininess of the undated photo based on the frequency of Fourier series signals represented across the image in the undated photo.

12. The method of claim 1, wherein the plurality of reference photos comprise photos stored in a database system maintaining family trees and having information associated with dates that the stored photos were taken.

* * * * *